C. H. MILLER & W. A. BUNNELL.
NON-FREEZING CONNECTION FOR TANKS.
APPLICATION FILED JAN. 15, 1910.
973,450.
Patented Oct. 18, 1910.
2 SHEETS—SHEET 1.
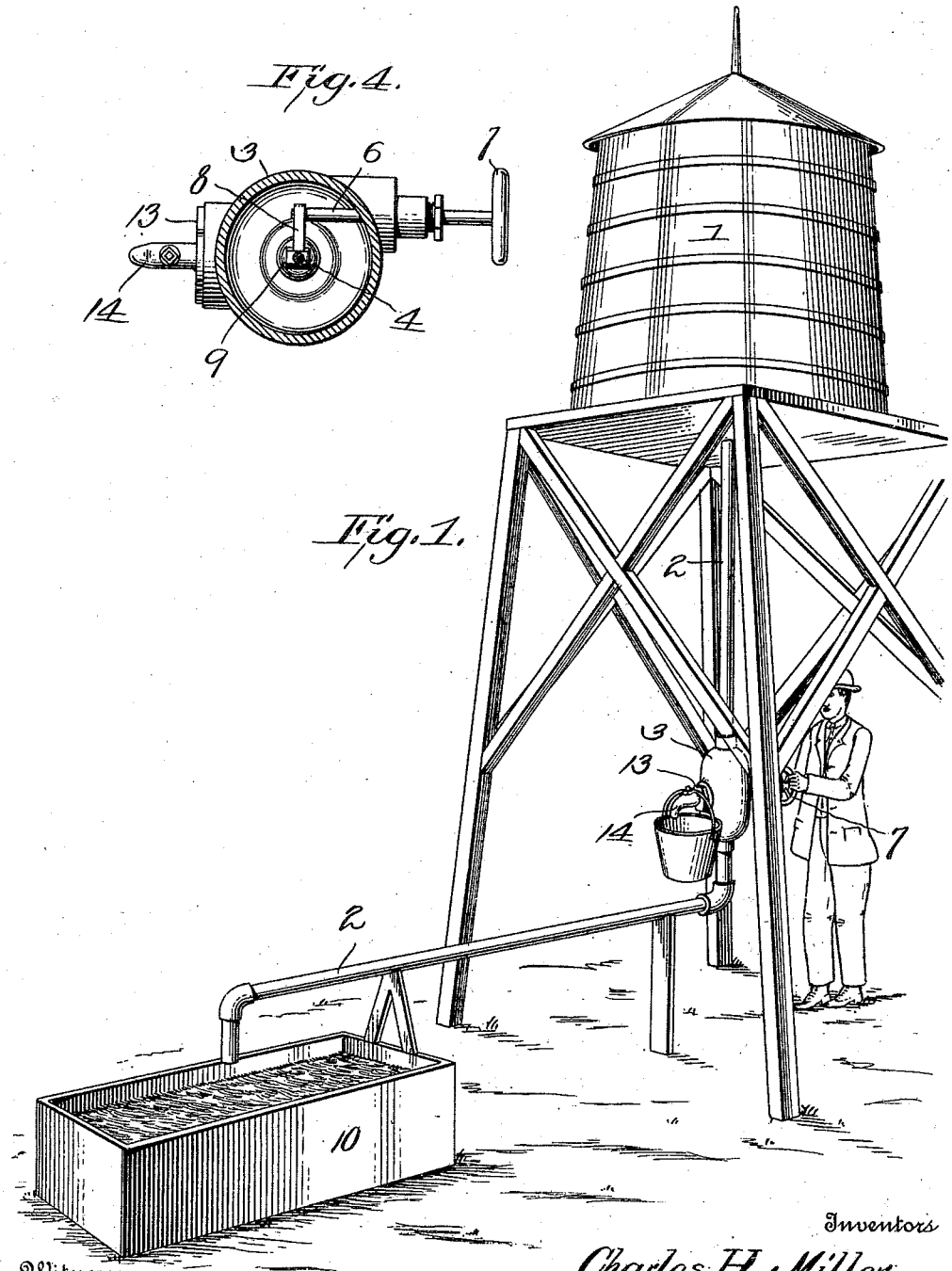

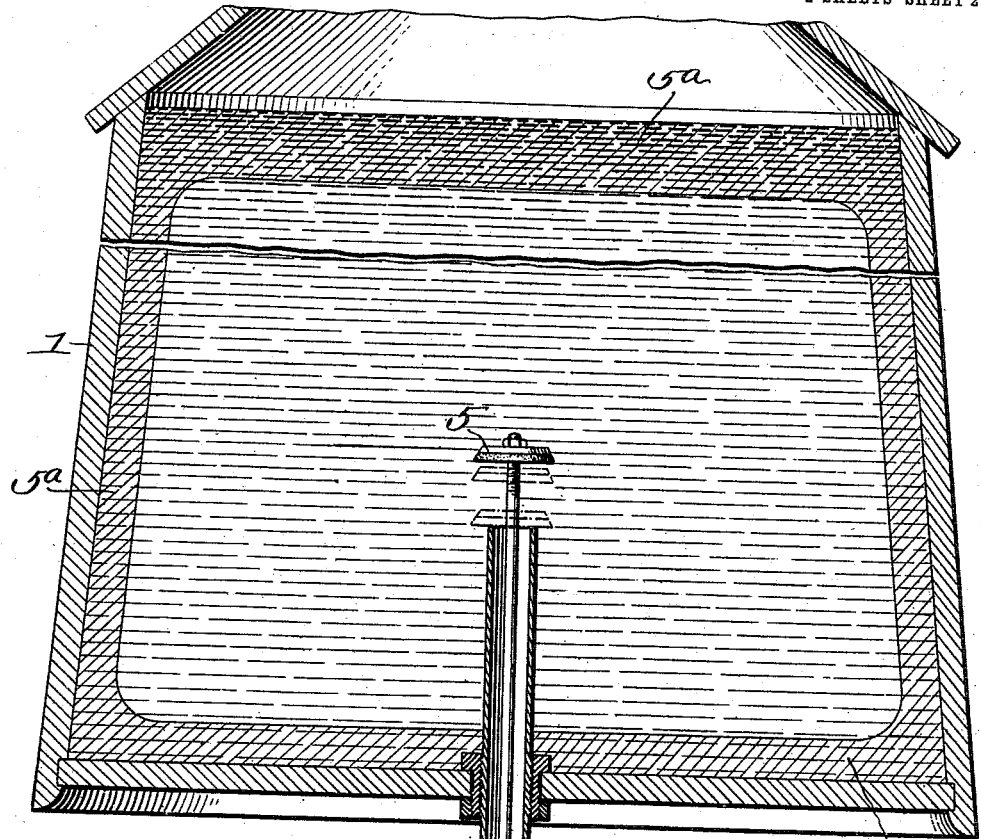
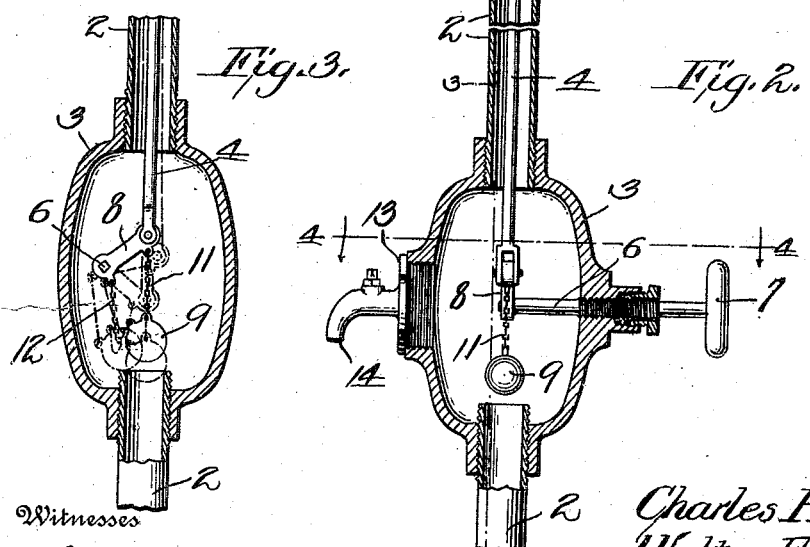

UNITED STATES PATENT OFFICE.

CHARLES HECTOR MILLER AND WALTER ALEX BUNNELL, OF DECATUR, TEXAS.

NON-FREEZING CONNECTION FOR TANKS.

973,450.           Specification of Letters Patent.     Patented Oct. 18, 1910.

Application filed January 15, 1910. Serial No. 538,281.

*To all whom it may concern:*

Be it known that we, CHARLES H. MILLER and WALTER A. BUNNELL, citizens of the United States, residing at Decatur, in the county of Wise and State of Texas, have invented a new and useful Improvement in Non-Freezing Connections for Tanks, of which the following is a specification.

This invention relates to a pipe connection and valve intended to be used with elevated, exposed water tanks or towers, and the object of the invention is to permit draining of the discharge pipe, and also to take water from a central portion of the tank, thereby preventing water from freezing during the winter in the discharge pipe, and to permit withdrawal of water from the tank during the winter after ice has formed in the tank itself.

We have found that in large tanks ice will form at the top and bottom and at the sides of the tank, and that with ice twelve or fifteen inches thick in the tank there will still be a large amount of water in the central portion of the tank not frozen. With tanks of large size ice would never, except in places unusually exposed to the weather, or in sections having unusually long and severe seasons of low temperatures, form of such thickness as to freeze from top to bottom and side to side of the tank.

Our invention consists in the novel features of construction hereinafter fully described, pointed out in the claims and shown in the accompanying drawings, in which, Figure 1 is a perspective view. Fig. 2 is a detail vertical section, parts being broken away. Fig. 3 is a section on the line 3—3 of Fig. 2. Fig. 4 is a section on the line 4—4 of Fig. 2.

In these drawings, 1 represents an elevated tank of any desired size or construction, and supplied with water by any desired means. A discharge pipe 2 extends downwardly and upwardly through the bottom of said tank, the said pipe opening upwardly in the central portion of said tank and at a considerable distance above the bottom of the tank. Adjacent the ground the pipe 2, which may be in any desired number of sections, has interposed in it a casing 3. Working through the pipe 2 from the casing 3 to the tank, and projecting upwardly into the tank and downwardly into the casing is a valve rod 4. A valve disk 5 is threaded upon the upper end portion of the rod 4 and is adapted to cover and close the upper end of the pipe 2. Journaled in the casing 3 is a shaft 6 provided at its outer end with a hand-wheel 7 and at its inner end with a crank arm 8, said crank arm being fixed upon a squared portion of the shaft 6. The crank arm 8 is pivotally connected to the lower end of the rod 4 and it will be obvious that a partial rotation of the shaft 6 by means of the hand-wheel 7 will elevate or lower the rod 4, according to the direction of rotation of the shaft. Depending from the arm 8 is a ball 9 adapted to fit and close the section of the pipe 2 which leads from the lower end of the casing 3, and it will be understood that the pipe 2 leads to and discharges into a suitable trough 10. The ball 9 is suspended by two chains 11 and 12, the chain 11 being the shorter, and connecting the ball with that end of the arm 8 which is pivoted to the rod 4. The chain 12 connects the ball with that end of the arm which is fixed upon the squared portion of the shaft 6.

The operation of these parts are as follows; assuming the parts to be in the position shown in Figs. 2 and 3. The valve 5 is in practically its highest position, water will flow from the tank through the pipe 2, through the casing 3 and from the casing through the remaining sections of the pipe 2 to the trough. In one side of the casing is threaded a plug 13, which plug carries a faucet 14. When it is desired to draw water for household purposes a bucket may be hung upon the faucet 14, and the faucet opened, and by turning the wheel 7, so as to slightly lower the rod 4 the ball 9 will seat itself in the lower section of the discharge pipe, and water passing from the tank to the casing will have an outlet only through the faucet 14. A further rotation of the wheel 7 will lower the rod 4 to such an extent that the valve 5 will seat itself upon the upper end of the pipe 2 and will prevent any additional flow of water from the tank into said pipe. This further downward movement of the rod 4 will be accompanied by corresponding movement upon the part of the crank arm 8 and the chain 12 will draw the ball 9 to one side, thus opening the lower end of the casing 3 and all water in the pipe 2 and the casing will be drained out into the trough 10, and no water can stand in any part of the pipe 2 or in the casing 3 when the valve 5 is in closed position. The plug 13 may be removed thus leaving a hand-hole in the side of the casing by means of which the connections between the rod 4 and the shaft 6 and the ball and the crank arm 8 may be made.

In Fig. 2 we have indicated at 5ª the formation of ice at the top, bottom and sides of the tank.

What we claim is:—

1. In a device of the kind described, a casing having a discharge outlet, a supply pipe leading to said casing, a second pipe leading from said casing, valves respectively controlling flow of liquid through said pipes, and common means for operating said valves, the valve associated with the second mentioned pipe occupying a closed position when the valve associated with the first mentioned pipe is in an intermediate position, as and for the purpose set forth.

2. The combination with an elevated tank, a sectional discharge pipe leading therefrom, a casing interposed between two of said sections and communicating with both, one of said sections extending centrally through the bottom of the tank and upwardly into the central portion of the tank, a rod freely movable in said section and projecting into the tank and into the casing, a disk valve secured upon the upper projecting portion of the rod, a shaft rotatably mounted in the casing, an arm fixed upon said shaft and pivotally connected to the lower end of the rod, and a ball suspended from two points on said arm, said ball closing the outlet from the casing when the rod is in a certain position, as and for the purpose set forth.

3. The combination with an overhead tank, of a discharge pipe leading from the inner central portion of said tank, a casing carried by said pipe, a valve adapted to close the upper inner end of the pipe, means mounted in said casing for operating said valve, means arranged without the casing for operating the valve operating mechanism within the casing, said casing having a discharge outlet in the side and a discharge outlet at its lower end, and a suspended ball carried by the valve operating mechanism, said ball closing the lower outlet of the casing when the valve controlling the upper end of the pipe is in an intermediate position but swinging to one side of said outlet when the first mentioned valve is in closed position, as and for the purpose set forth.

CHARLES HECTOR MILLER.
WALTER ALEX BUNNELL.

Witnesses:
EDWARD O. LIVELY,
WESCOTT HELM.